United States Patent
Choi

(10) Patent No.: US 11,195,476 B1
(45) Date of Patent: Dec. 7, 2021

(54) DISPLAY DEVICE AND METHOD OF OPERATING THE SAME

(71) Applicant: LG ELECTRONICS INC., Seoul (KR)

(72) Inventor: Seongwook Choi, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 0 days.

(21) Appl. No.: 17/006,367

(22) Filed: Aug. 28, 2020

(30) Foreign Application Priority Data

Jul. 14, 2020 (WO) ................ PCT/KR2020/009269

(51) Int. Cl.
*G09G 3/34* (2006.01)

(52) U.S. Cl.
CPC ... *G09G 3/3406* (2013.01); *G09G 2320/0626* (2013.01); *G09G 2330/023* (2013.01); *G09G 2360/144* (2013.01); *G09G 2370/02* (2013.01); *G09G 2370/022* (2013.01)

(58) Field of Classification Search
CPC .......... G09G 3/3406–3426; G09G 2320/0626; G09G 2330/021; G09G 2330/023; G09G 2360/14; G09G 2360/144; G09G 2370/02; G09G 2370/022
See application file for complete search history.

(56) References Cited

U.S. PATENT DOCUMENTS

| | | | | |
|---|---|---|---|---|
| 6,900,798 | B2 * | 5/2005 | Heie | .................... G09G 3/3611 345/211 |
| 8,726,054 | B2 * | 5/2014 | Hsiu | .................... G06F 1/3265 713/320 |
| 2009/0109246 | A1 | 4/2009 | Oh | |
| 2009/0201271 | A1 | 8/2009 | Michiyasu et al. | |
| 2010/0030612 | A1 * | 2/2010 | Kim | .................... G06Q 10/1095 705/7.18 |
| 2011/0115766 | A1 * | 5/2011 | Kerofsky | ......... H04N 21/42202 345/207 |

(Continued)

FOREIGN PATENT DOCUMENTS

| | | |
|---|---|---|
| KR | 101120196 | 3/2012 |
| KR | 1020160011181 | 1/2016 |

(Continued)

OTHER PUBLICATIONS

PCT International Application No. PCT/KR2020/009269, International Search Report dated Mar. 31, 2021, 3 pages.

*Primary Examiner* — Gene W Lee
(74) *Attorney, Agent, or Firm* — Lee, Hong, Degerman, Kang & Waimey

(57) ABSTRACT

A display apparatus includes a display including a display panel and a backlight unit configured to provide light to the display panel, a network interface configured to receive power supply information from a server, and a controller configured to determine whether a current power situation is a power alert occurrence situation based on the power supply information, enable an operation mode of the display apparatus to enter an energy saving mode in case of the power alert occurrence situation, obtain viewing environment information according to entry into the energy saving mode, and control the backlight unit to adjust output brightness of the display panel based on the obtained viewing environment information.

18 Claims, 11 Drawing Sheets

(56) References Cited

U.S. PATENT DOCUMENTS

| | | | |
|---|---|---|---|
| 2011/0310071 A1* | 12/2011 | Segall | G09G 3/3406 345/207 |
| 2014/0354827 A1* | 12/2014 | Nakashima | H04N 21/8153 348/177 |
| 2017/0111975 A1 | 4/2017 | Lee et al. | |
| 2017/0116962 A1* | 4/2017 | Goodman | G06T 15/80 |
| 2018/0204524 A1* | 7/2018 | Kucera | G09G 3/30 |

FOREIGN PATENT DOCUMENTS

| | | |
|---|---|---|
| KR | 1020170045561 | 4/2017 |
| KR | 1020180111712 | 10/2018 |

* cited by examiner

1100

| POWER SUPPLY SITUATION LEVEL | MINIMUM BRIGHTNESS (LUX) OF DISPLAY PANEL |
|---|---|
| INTEREST LEVEL | 200 |
| CRISIS LEVEL | 150 |
| MAXIMUM CRISIS LEVEL | 100 |

DISPLAY DEVICE AND METHOD OF OPERATING THE SAME

CROSS-REFERENCE TO RELATED APPLICATIONS

Pursuant to 35 U.S.C. § 119, this application claims the benefit of earlier filing date and right of priority to International Application No. PCT/KR2020/009269, filed on Jul. 14, 2020, the contents of which are all hereby incorporated by reference herein in its entirety.

BACKGROUND

The present disclosure relates to a display apparatus and a method of operating the same.

Digital TV services using wired or wireless communication networks are becoming common. Digital TV service can provide a variety of services that could not be provided in the conventional analog broadcasting service.

For example, IPTV (Internet Protocol Television), which is a type of digital TV service, and smart TV service provide bidirectionality that allows a user to actively select a type of viewing the program and viewing time. IPTV, smart TV service may provide a variety of additional services, such as Internet search, home shopping, and online games based on this bidirectionality.

The TV receives power from a power supplier.

In the related art, whether to reduce power consumption of the TV has been determined according to viewer's selection, regardless of the power supply situation of the power supplier.

Accordingly, there is a need for operation capable of organically saving energy according to the power supply situation of the power supplier.

SUMMARY

The present disclosure is devised to solve the above-described problems and an object of the present disclosure is to save energy in connection with a power supplier in the event of a power supply crisis.

Another object of the present disclosure is to save energy while considering the viewing environment of a viewer in the event of a power supply crisis.

A display apparatus according to an embodiment of the present disclosure includes a display apparatus includes a display including a display panel and a backlight unit configured to provide light to the display panel, a network interface configured to receive power supply information from a server, and a controller configured to determine whether a current power situation is a power alert occurrence situation based on the power supply information, enable an operation mode of the display apparatus to enter an energy saving mode in case of the power alert occurrence situation, obtain viewing environment information according to entry into the energy saving mode, and control the backlight unit to adjust output brightness of the display panel based on the obtained viewing environment information.

A method of operating a display apparatus including a display including a display panel and a backlight unit configured to provide light to the display panel according to an embodiment of the present disclosure may include receiving power supply information from a server, determining whether a current power situation is a power alert occurrence situation based on the power supply information, enabling an operation mode of the display apparatus to enter an energy saving mode in case of the power alert occurrence situation, obtaining viewing environment information according to entry into the energy saving mode, and controlling the backlight unit to adjust output brightness of the display panel based on the obtained viewing environment information.

BRIEF DESCRIPTION OF THE DRAWINGS

FIG. 10 is a view illustrating an example of adjusting output brightness of a display panel to brightness determined according to ambient brightness when an illuminance sensor is turned on.

FIG. 11 is a view illustrating minimum brightness of a display panel output according to a level of a power supply situation when an illuminance sensor is turned off according to an embodiment of the present disclosure.

FIG. 12 is a view illustrating an example of adjusting output brightness of a display panel to brightness determined according to ambient brightness in consideration of a level of a power supply situation when an illuminance sensor is turned on.

DETAILED DESCRIPTION OF THE EMBODIMENTS

Hereinafter, specific embodiments of the present disclosure will be described in detail with reference to the drawings.

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function.

Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
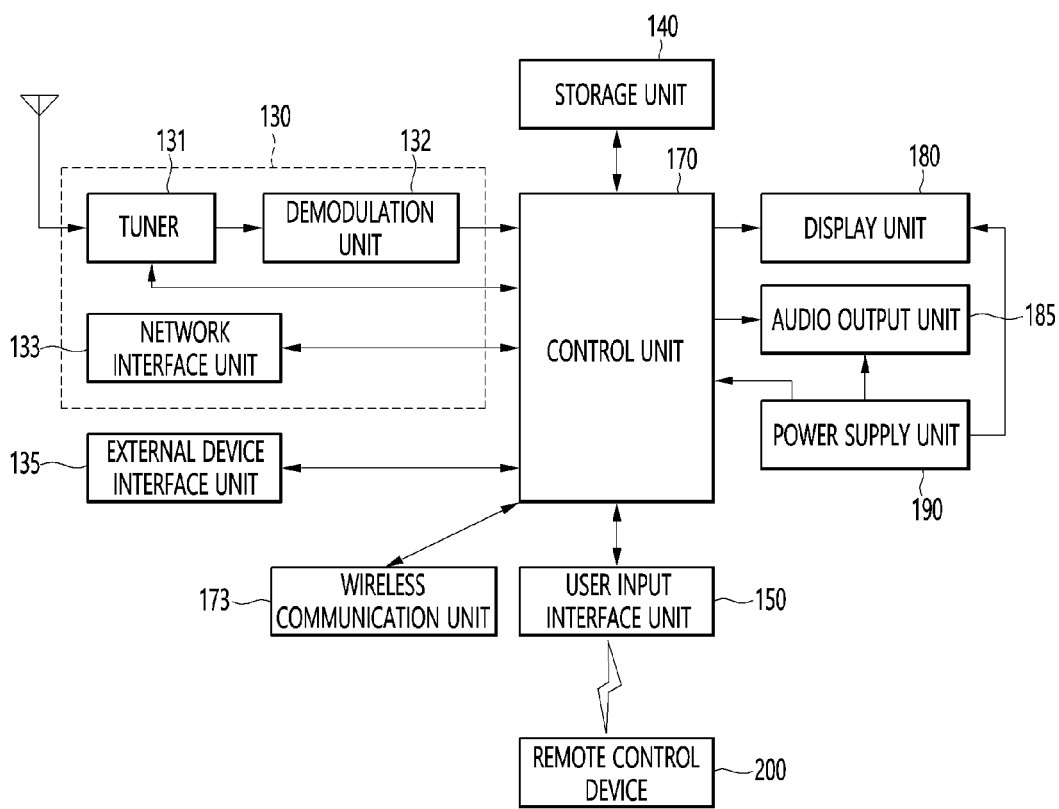
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A voice signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. In other words, the network interface unit 133 can transmit or receive data to or from a corresponding server by accessing a predetermined webpage through the network.

Then, the network interface unit 133 can receive contents or data provided from a content provider or a network operator. In other words, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not illustrated) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

The wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
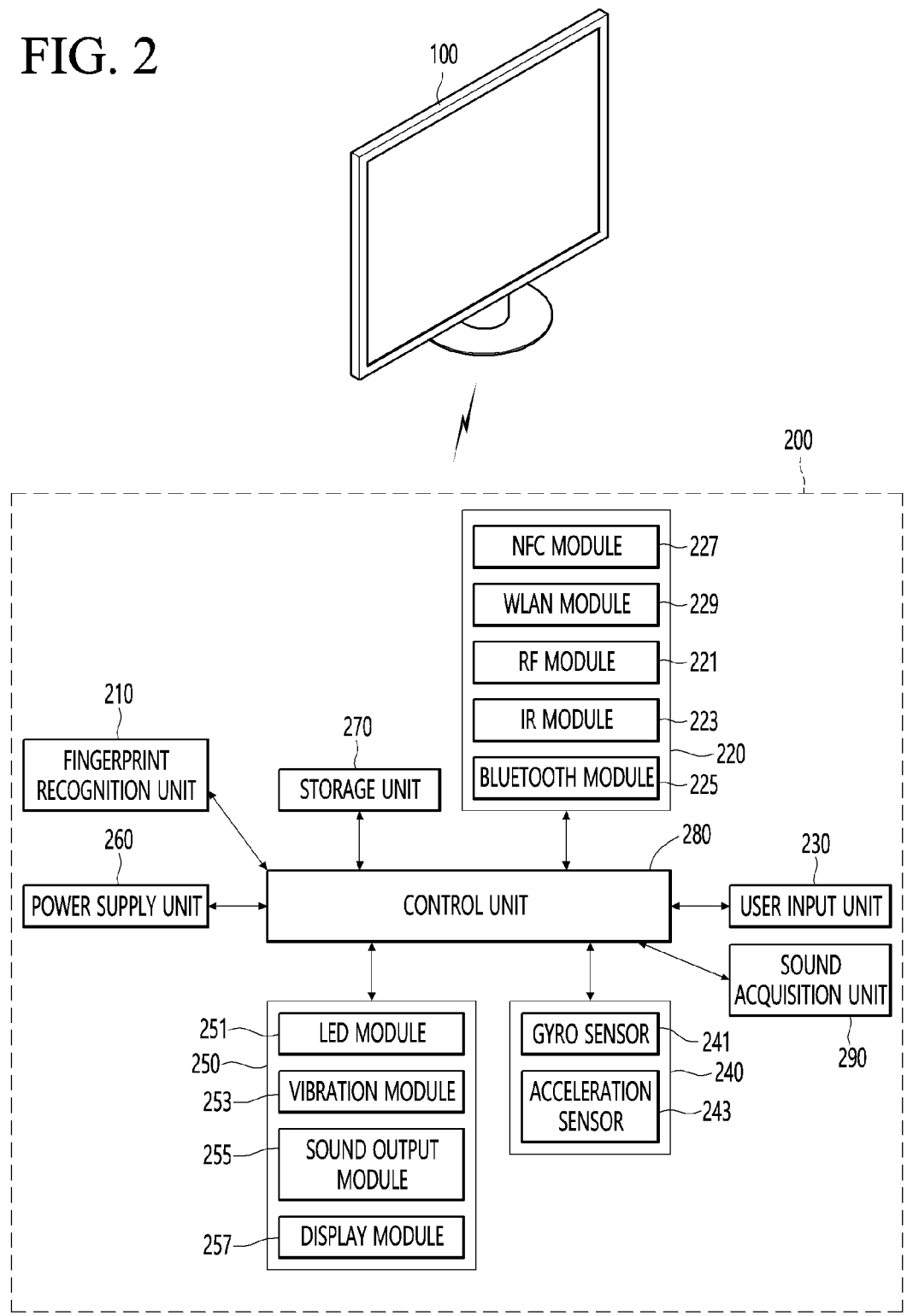
FIG. 2 is a block diagram illustrating a remote control device according to an embodiment of the present disclosure.
Figure 3:
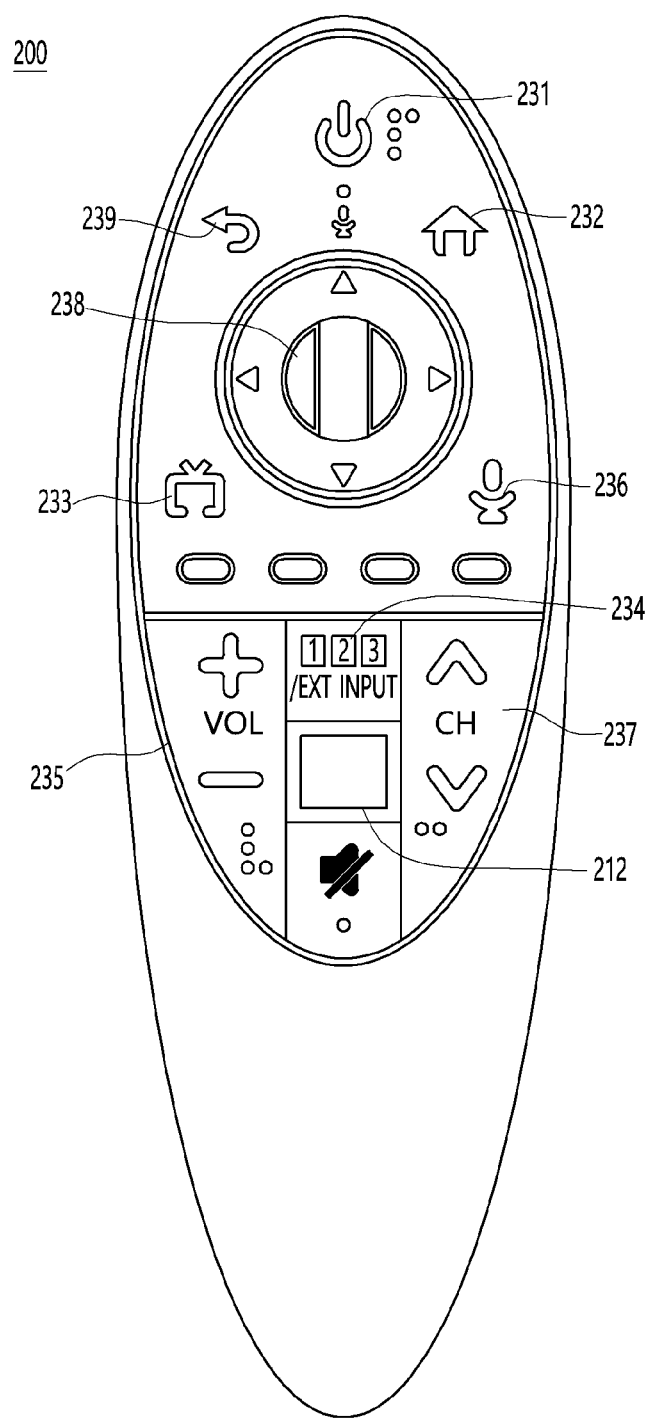
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 235 or a signal corresponding to movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
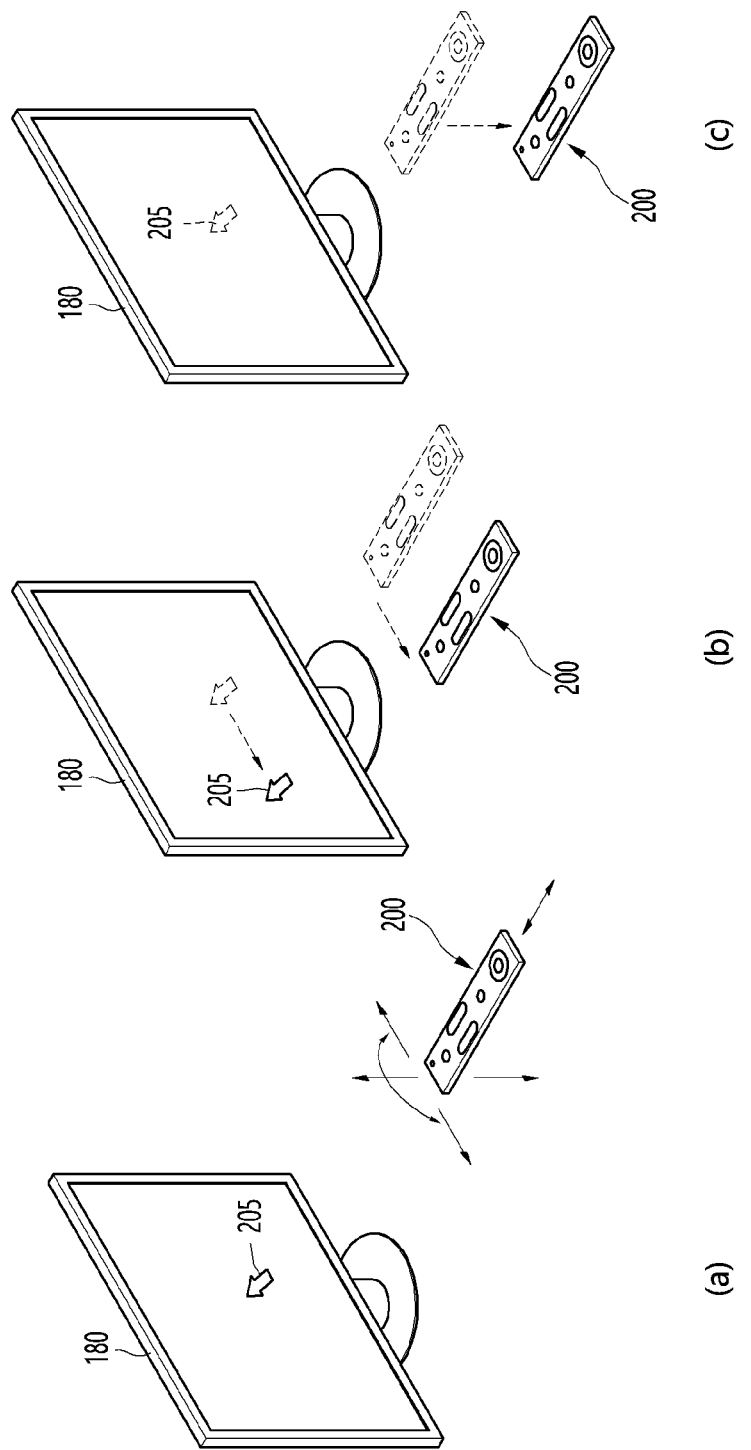
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the contrary, if the user moves the remote control device 200 to approach the display unit 180, the selection area in the display unit 180 corresponding to the pointer 205 may be zoomed out and reduced.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. In other words, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
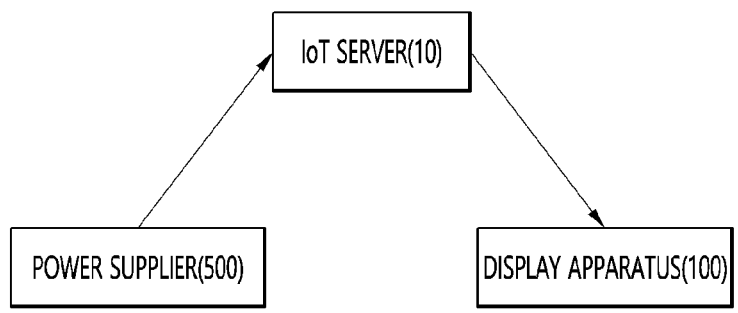
FIG. 5 is a view illustrating the configuration of a system according to an embodiment of the present disclosure.

FIG. 5 is a view illustrating the configuration of a system according to an embodiment of the present disclosure.

The system 50 according to the embodiment of the present disclosure may include a power supplier 500, an IoT server 10 and a display apparatus 100.

The power supplier 500 may be a power supply server or a power management server operated by a country or a power company.

The IoT server 10 may be a sever for controlling operation of home appliances provided in the home.

The IoT server 10 may receive power supply information from the power supplier 500.

The power supply information may include information on a power use state of the power supplier 500. More specifically, the power supply information may include information indicating that a power supply crisis occurs due to high power consumption.

As another example, the power supply information may include levels of power supply situations.

For example, the level of the power supply situation may be an interest level when a power usage is equal to or greater than a first usage, may be a crisis level when the power usage is equal to or greater than a second usage greater than the first usage, and may be a maximum crisis level when the power usage is equal to or greater than a third usage greater than the second usage.

The display apparatus 100 may receive the power supply information from the IoT server 10.

In another embodiment, the display apparatus 100 may directly receive the power supply information from the power supplier 500.

Figure 6:
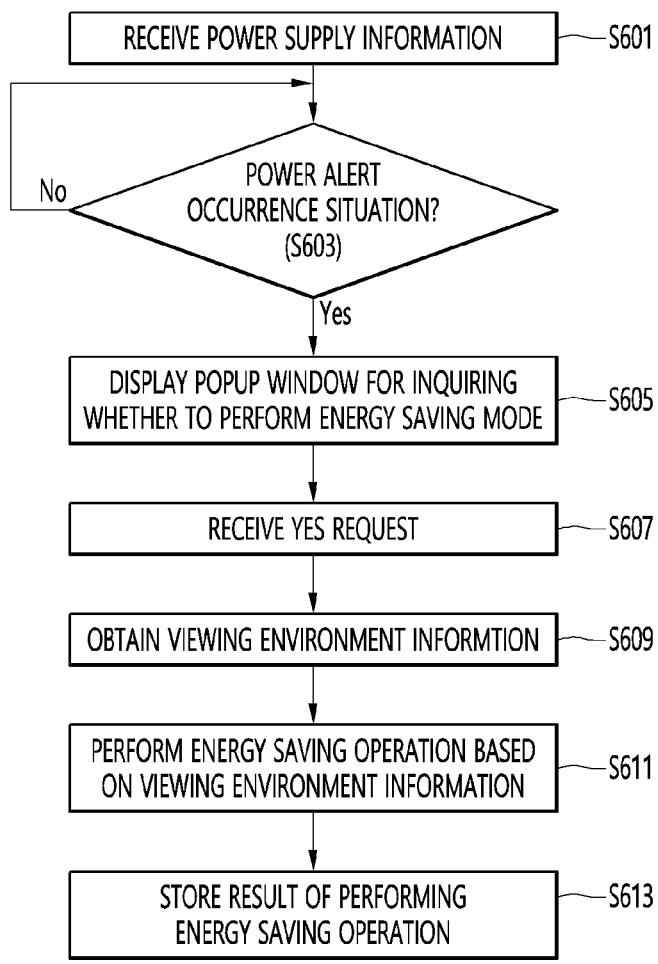
FIG. 6 is a flowchart illustrating a method of operating a display apparatus according to an embodiment of the present disclosure.

FIG. 6 is a flowchart illustrating a method of operating a display apparatus according to an embodiment of the present disclosure.

Referring to FIG. 6, the control unit 170 of the display apparatus 100 receives the power supply information from the outside (S601).

In one embodiment, the control unit 170 may receive the power supply information through the network interface unit 133 through the power supplier 500 or the IoT server 10.

The control unit 170 determines whether a current power situation is a power alert occurrence situation based on the received power supply information (S603).

The control unit 170 may use the power supply information to determine whether the current power situation requires energy saving of the display apparatus 100.

In one embodiment, the power supply information may include a warning signal indicating an excessive power use situation.

The control unit 170 may determine that the current power situation is a power alert occurrence situation, when the alert signal is included in the power supply information.

In another embodiment, the control unit 170 may determine that the current power situation is the power alert occurrence situation, when the level of the power supply situation indicated by the power supply information is equal to or greater than a reference level.

The levels of the power supply situations may include a normal level, an interest level, a crisis level and a maximum crisis level according to the power usage of the power supplier 500.

The control unit 170 may determine that the level of the power supply situation is equal to or greater than the reference level, when the level of the power supply situation is any one of the interest level, the crisis level or the maximum crisis level.

The control unit 170 may determine that the reference level is not satisfied, when the level of the power supply situation is the normal level.

The control unit 170 displays a popup window for inquiring whether to perform an energy saving mode on the display unit 180 (S605), when the current power situation is the power information occurrence situation.

The energy saving mode may be a mode for reducing the power usage of the display apparatus 100.

Specifically, the energy saving mode may be a mode for controlling the backlight unit provided in the display unit 180 to reduce the luminance of the display apparatus 100.

The popup window for inquiring whether to perform the energy saving mode will be described with reference to FIG. 7.

Figure 7:
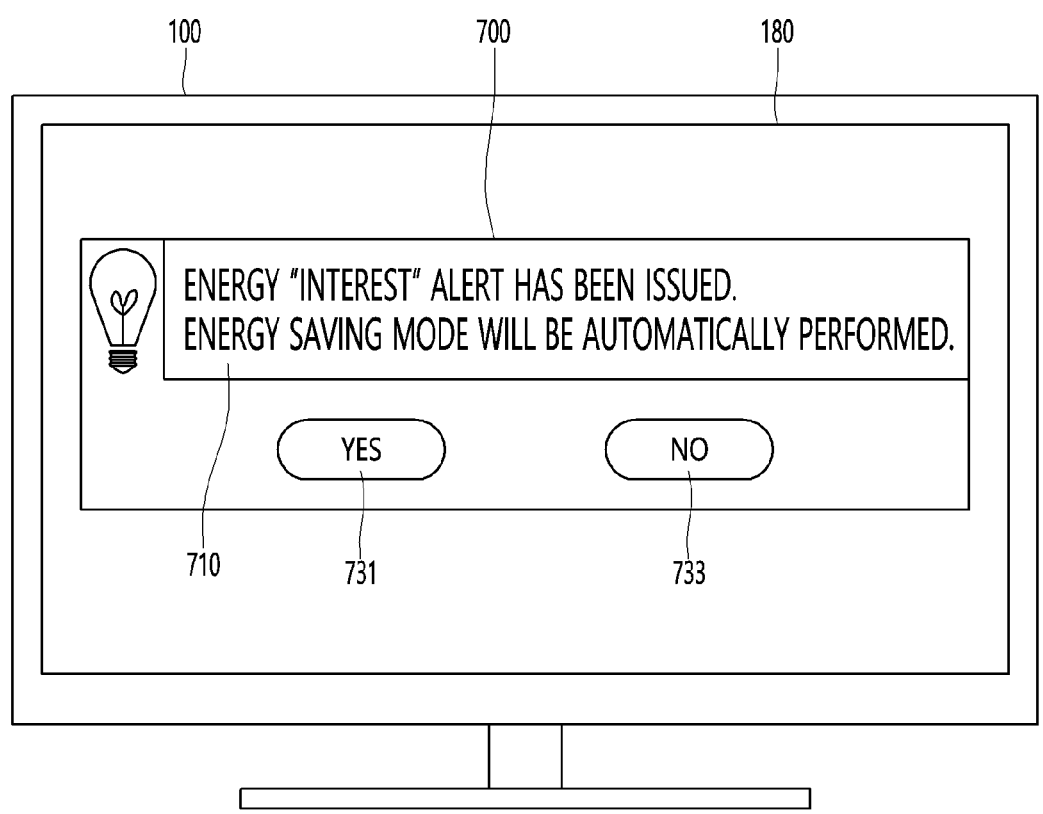
FIG. 7 is a view illustrating a popup window for inquiring whether to perform an energy saving mode according to reception of power supply information.

FIG. 7 is a view illustrating a popup window for inquiring whether to perform an energy saving mode according to reception of power supply information.

Referring to FIG. 7, the display apparatus 100 may display a popup window 700 for inquiring whether to perform the energy saving mode on the display unit 180, when the power supply situation is the power alert occurrence situation.

In another embodiment, the control unit 170 may output audio indicating the power alert occurrence situation through the audio output unit 185 while displaying the popup window 700.

The popup window 700 may include text 710 indicating performance of the power supply situation and the energy saving mode, an approval button 731 for entering the energy saving mode and a rejection button 733.

The control unit 170 may control the operation mode of the display apparatus 100 to enter the energy saving mode, when an input signal for selecting the approval button 731 is received.

According to another embodiment of the present disclosure, when the current power situation is the power alert occurrence situation, the display apparatus 100 may control the operation mode of the display apparatus 100 to enter the energy saving mode without separate user input.

FIG. 6 will be described again.

The control unit 170 receives a consent request for entry into the energy saving mode (S607), and obtains viewing environment information in response to the received consent request (S609).

In one embodiment, the viewing environment information may include one or more of whether the illuminance sensor provided in the display apparatus 100 is turned on or off, information on the backlight unit provided in the display unit 180, ambient brightness measured through the illuminance sensor when the illuminance sensor is turned on, and the power state of the lighting apparatus connectable with the display apparatus 100 through the IoT server 10.

The display apparatus 100 may include one or more illuminance sensors. One or more illuminance sensors may measure the ambient illuminance value of the display apparatus 100 and transfer the measured illuminance value to the control unit 170.

The illuminance sensor may be provided separately from the display apparatus 100. In this case, the display apparatus 100 may receive the illuminance value from the illuminance sensor through a short-range wireless communication interface.

The control unit (controller) 170 may collect the viewing environment information, when the display apparatus 100 enters the energy saving mode.

The control unit 170 may obtain the viewing environment information used to determine energy saving operation, when the display apparatus 100 is in the energy saving mode.

The backlight unit may be disposed on one surface of the display panel of the display unit 180 to provide light to the display panel.

The backlight unit may include a lamp unit and an LED driving circuit.

The lamp unit may provide light to the display panel. The lamp unit may include a plurality of LEDs or a plurality of OLEDs. The LED driving circuit may control the lamp unit to adjust the output luminance of the display panel.

Information on the backlight unit may include luminance controlled through the backlight unit.

The control unit 170 performs power saving operation based on the obtained viewing environment information (S611).

In one embodiment, the control unit 170 may control the backlight unit to adjust the output brightness of the display panel to predetermined minimum brightness when the illuminance sensor is turned off.

The predetermined minimum brightness may be 200 lux, which is merely an example.

In another embodiment, the control unit 170 may control the backlight unit to adjust the output brightness according to the ambient brightness measured by the illuminance sensor, when the illuminance sensor is turned on.

Figure 8:
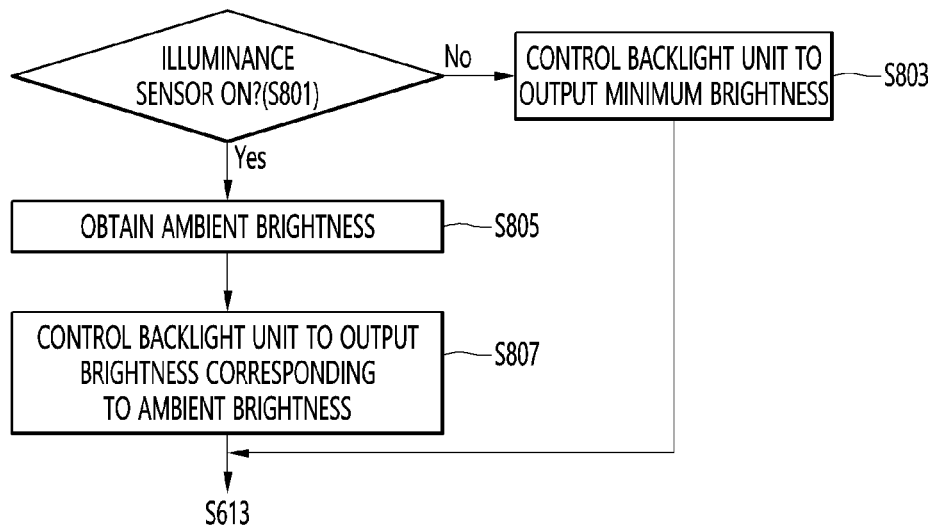
FIG. 8 is a flowchart illustrating a process of adjusting output brightness of a display panel depending on whether an illuminance sensor is turned on/off.

FIG. 8 is a flowchart illustrating a process of adjusting output brightness of a display panel depending on whether an illuminance sensor is turned on/off.

Referring to FIG. 8, the control unit 170 determines whether the illuminance sensor is turned on (S801).

When the illuminance sensor is turned off, the control unit 170 controls the backlight unit such that the display panel outputs minimum brightness (S803).

When the illuminance sensor is turned off, the control unit 170 may control the LED driving circuit of the backlight unit such that the display panel outputs predetermined minimum brightness.

This will be described with reference to FIG. 9.

Figure 9:
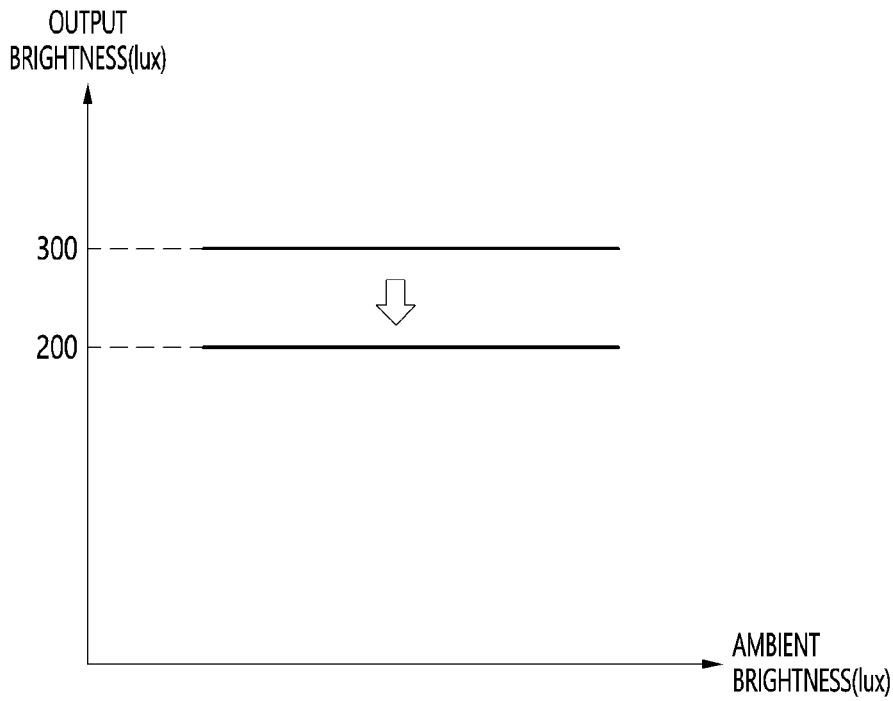
FIG. 9 is a view illustrating backlight control executed in an energy saving mode when an illuminance sensor is turned off.

FIG. 9 is a view illustrating backlight control executed in an energy saving mode when an illuminance sensor is turned off.

In FIG. 9, it is assumed that the operation mode of the display apparatus 100 is an energy saving mode.

When the illuminance sensor is turned off in the energy saving mode, the display apparatus 100 may control the backlight unit to adjust the output brightness of the display panel from first brightness (300 lux) to second brightness (200 lux).

The first brightness (300 lux) may be brightness currently output from the display panel and the second brightness (200 lux) may be predetermined minimum brightness.

That is, since the illuminance sensor is turned off and thus information on ambient brightness is not known, the display apparatus 100 may change the brightness of the display panel to minimum brightness regardless of the viewing environment of a viewer.

The output brightness of the display panel and the power consumption of the display panel are in a proportional relationship.

That is, as the output brightness of the display panel decreases, power consumption decreases. Therefore, it is possible to perform energy saving operation of the display apparatus 100.

FIG. 8 will be described again.

When the illuminance sensor is turned on, the control unit 170 acquires ambient brightness through the illuminance sensor (S805).

When the illuminance sensor is turned on, the control unit 170 may receive ambient brightness measured by the illuminance sensor from the illuminance sensor.

The control unit 170 controls the backlight unit to output brightness corresponding to the obtained ambient brightness (S807).

The control unit 170 may control the backlight unit to output predetermined brightness according to the obtained ambient brightness.

The control unit 170 may have a table indicating correlation between ambient brightness and output brightness stored in the storage unit 140.

The control unit 170 may adjust the current output brightness of the display panel to the output brightness corresponding to ambient brightness.

This will be described with reference to FIG. 10.

Figures 10, 11:
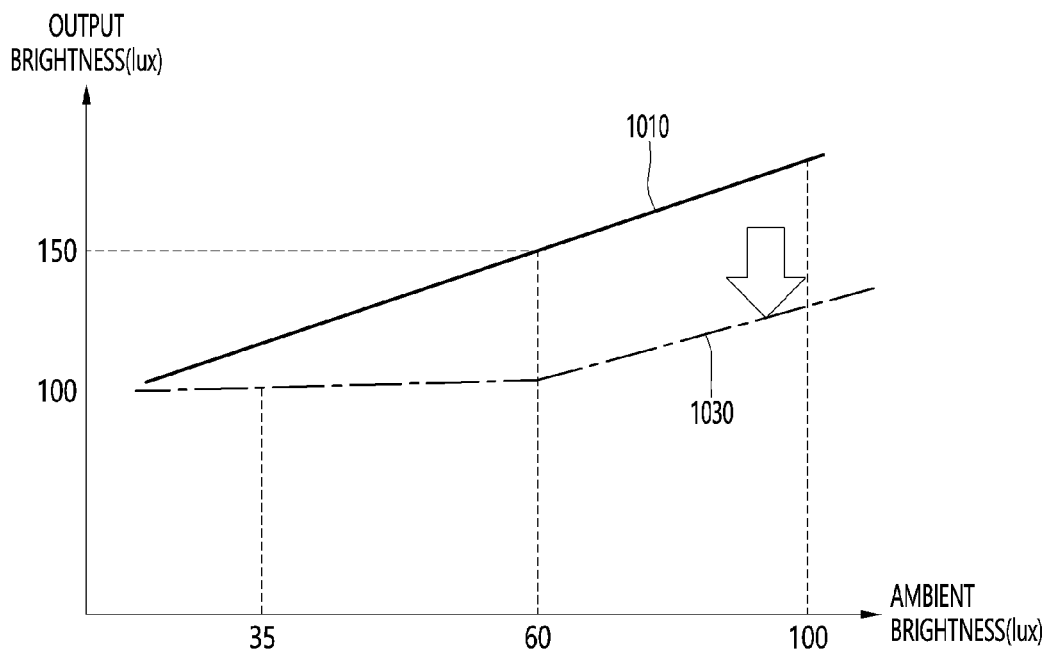

FIG. 10 is a view illustrating an example of adjusting output brightness of a display panel to brightness determined according to ambient brightness when an illuminance sensor is turned on.

Referring to FIG. 10, a first graph 1010 represents change in output brightness of the display panel according to ambient brightness in a normal mode of the display apparatus 100.

A second graph 1030 represents change in output brightness of the display panel according to ambient brightness in the energy saving mode of the display apparatus 100.

When the illuminance sensor is turned on in the energy saving mode of the display apparatus 100, the control unit 170 may determine output brightness corresponding to the ambient brightness measured by the illuminance sensor using the second graph 1030.

For example, when the measured ambient brightness is 60 lux in the normal mode, the display apparatus 100 may determine the output brightness of the display panel as 150 lux.

When the operation mode of the display apparatus 100 is switched from the normal mode to the energy saving mode and the ambient brightness measured by the illuminance sensor is 60 lux, the output brightness of the display panel may be determined as 100 lux.

100 lux may be limited brightness to ensure a minimum viewing environment.

According to one embodiment of the present disclosure, the output brightness of the display panel may be adjusted according to ambient brightness, thereby saving energy with minimal impact on viewer's viewing of video.

According to another embodiment of the present disclosure, when the illuminance sensor is turned off, the minimum brightness may be changed according to the level of the power supply situation.

FIG. 11 is a view illustrating minimum brightness of a display panel output according to a level of a power supply situation when an illuminance sensor is turned off according to an embodiment of the present disclosure.

FIG. 11 shows a table indicating a relationship between the power supply situation level included in the power supply information and the minimum brightness of the display panel in the energy saving mode of the display apparatus 100.

The table 1100 of FIG. 11 may be pre-stored in the storage unit 140.

The display apparatus 100 may determine the minimum output brightness of the display panel using the level of the power supply situation included in the power supply information.

When the power supply situation level is an interest level, the display apparatus 100 may determine the minimum brightness of the display panel as 200 lux.

When the power supply situation level is a crisis level, the display apparatus 100 may determine the minimum brightness of the display panel as 150 lux.

When the power supply situation level is a maximum crisis level, the display apparatus 100 may determine the minimum brightness of the display panel as 100 lux.

The display apparatus 100 may control the backlight unit to output the determined minimum brightness.

According to the embodiment of the present disclosure, the output brightness of the display panel is adjusted according to the level of the power supply situation, thereby obtaining an energy saving effect while considering the viewing environment of the viewer.

Figure 12:
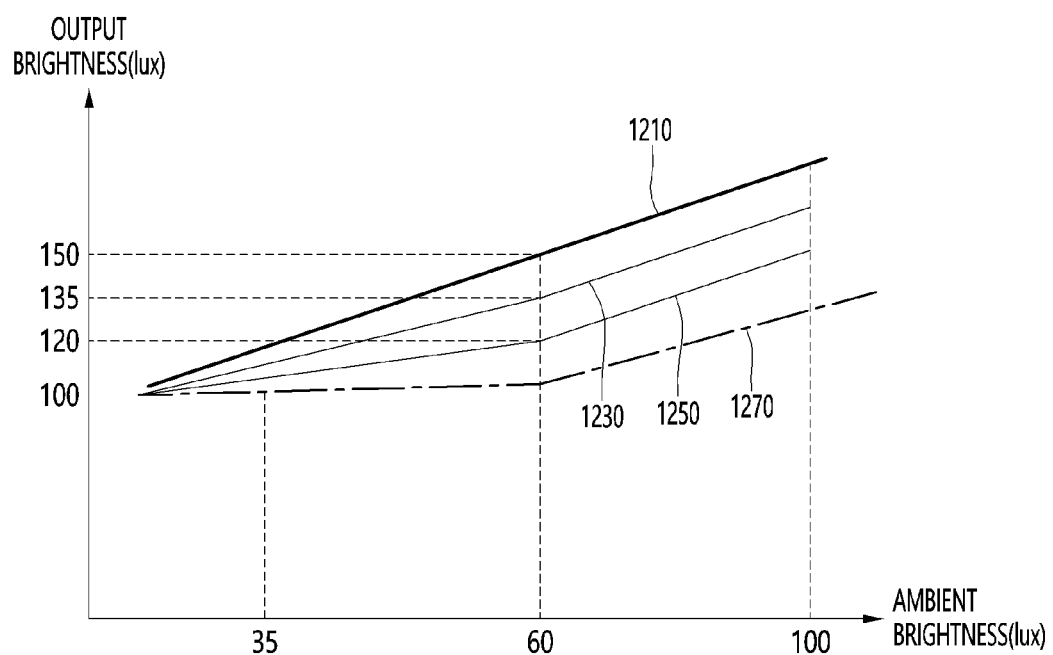

FIG. 12 is a view illustrating an example of adjusting output brightness of a display panel to brightness determined according to ambient brightness in consideration of a level of a power supply situation when an illuminance sensor is turned on.

Referring to FIG. 12, a first graph 1210 represents change in the output brightness of the display panel according to ambient brightness in the normal mode of the display apparatus 100.

A second graph 1230 represents change in the output brightness of the display panel according to ambient brightness when the level of the power supply situation is an interest level in the energy saving mode of the display apparatus 100.

A third graph 1250 represents change in the output brightness of the display panel according to ambient brightness when the level of the power supply situation is a crisis level in the energy saving mode of the display apparatus 100.

A fourth graph 1270 represents change in the output brightness of the display panel according to ambient brightness when the level of the power supply situation is a maximum crisis level in the energy saving mode of the display apparatus 100.

That is, when the illuminance sensor is turned on in the energy saving mode, the display apparatus 100 may adjust the output brightness of the display panel in consideration of the level of the power supply situation.

Therefore, it is possible to obtain an energy saving effect while maximally considering the viewing environment of the viewer.

FIG. 6 will be described again.

The control unit 170 stores a result of performing the energy saving operation in the storage unit 140 (S613).

The result of performing the energy saving operation may include the determined output brightness of the display panel and the maintaining time of the output brightness.

The control unit 170 may calculate an energy saving amount using the result of performing the energy saving operation. For example, when the illuminance sensor is turned off and the brightness of the display panel is adjusted from 300 to 200 lux, the energy saving amount of 20 W/h may be calculated.

The control unit 170 may transmit the result of performing the energy saving operation to the IoT server 10. The IoT server 10 may calculate the energy saving amount using the result of performing the energy saving operation.

Figure 13:
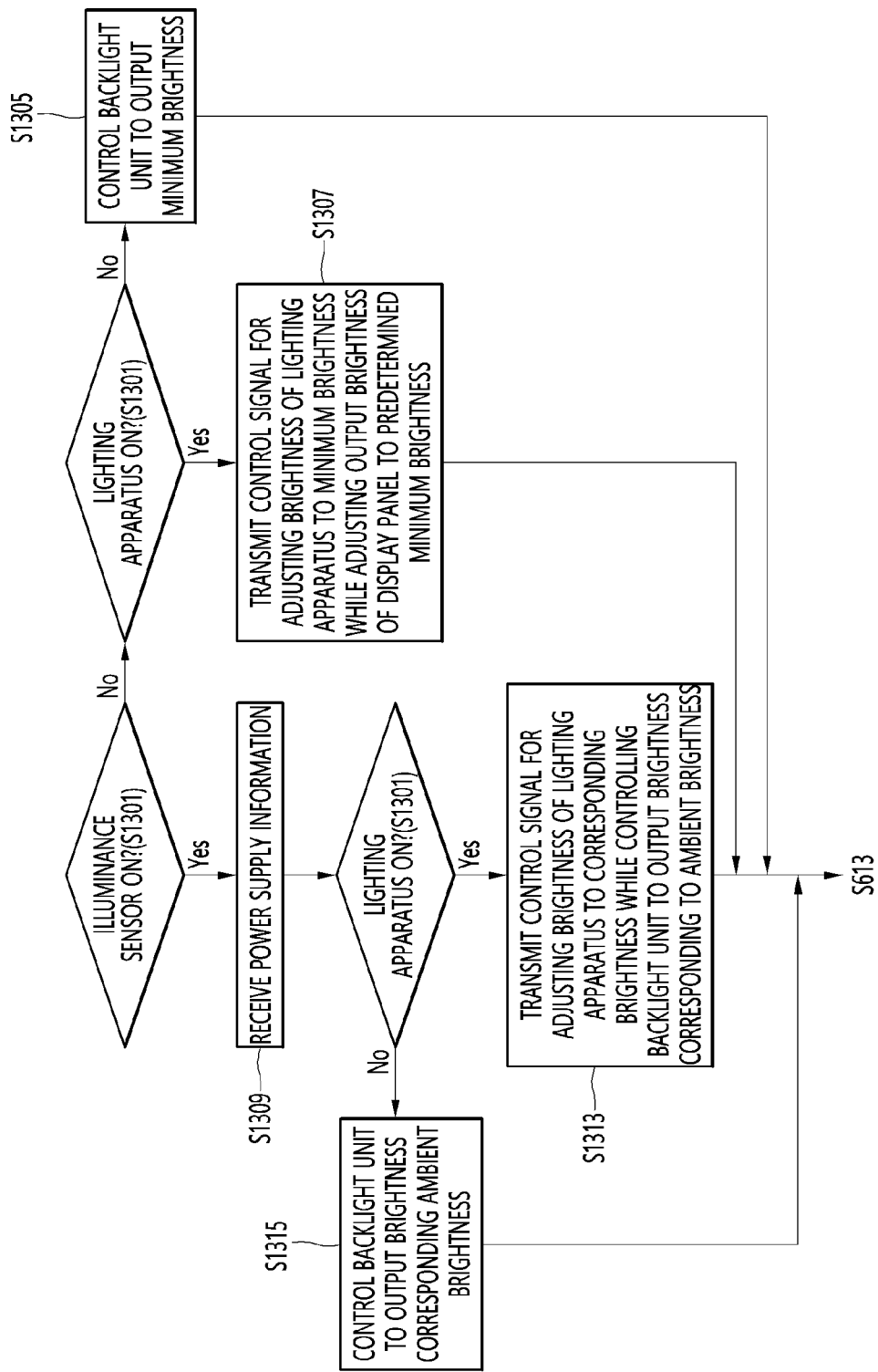
FIGS. 13 and 14 are views illustrating a process of controlling output brightness of a display panel and brightness of a lighting apparatus depending whether an illuminance sensor is turned on/off and whether the lighting apparatus connected to a display panel is turned on/off.
Figure 14:
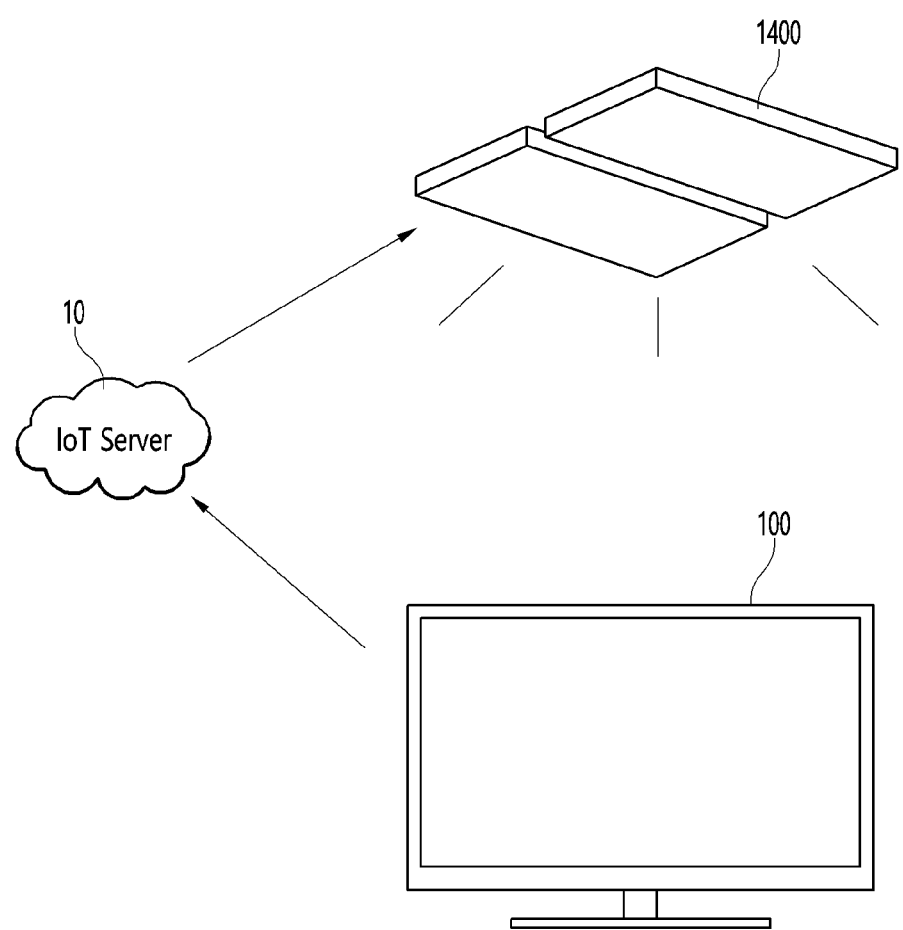

FIGS. 13 and 14 are views illustrating a process of controlling output brightness of a display panel and brightness of a lighting apparatus depending whether an illuminance sensor is turned on/off and whether the lighting apparatus connected to a display panel is turned on/off.

In particular, FIG. 13 is an example of the detailed process of step S611 of FIG. 6.

In FIGS. 13 and 14, the display apparatus 100 may be connected with a lighting apparatus 1400 located in the same space as the display apparatus 100.

The display apparatus 100 and the lighting apparatus 1400 may be provided in the home to be connected with each other through the IoT server 10.

Referring to FIG. 13, the control unit 170 of the display apparatus 100 determines whether the illuminance sensor is turned on (S1301).

When the illuminance sensor is turned off, the control unit 170 determines whether the lighting apparatus 1400 is turned on (S1303).

The control unit 170 requests, from the IoT server 10, the power state of the lighting apparatus 1400 and receive, from the IoT server 10, the power state of the lighting apparatus 1400.

The power state of the lighting apparatus 1400 may be the on or off state of the lighting apparatus 1400.

When the lighting apparatus 1400 is turned off, the control unit 170 controls the backlight unit to output predetermined minimum brightness (S1305).

This has been described in the embodiment of FIG. 9 or 11.

When the lighting apparatus 1400 is turned on, the control unit 170 transmits a control signal for adjusting the brightness of the lighting apparatus 1400 to predetermined minimum brightness to the IoT server 10 while adjusting the output brightness of the display panel to predetermined minimum brightness (S1307).

When the lighting apparatus 1400 is turned on, the control unit 170 may perform control such that both the output brightness of the display panel and the output brightness of the lighting apparatus 1400 become predetermined minimum brightness.

To this end, the control unit 170 may control the backlight unit such that the output brightness of the display panel becomes predetermined minimum brightness.

At the same time, the control unit 170 may transmit, to the IoT server 10, a control signal for controlling the brightness of the lighting apparatus 1400 to predetermined brightness. The IoT server 10 may transmit the control signal to the display apparatus 100.

The lighting apparatus 1400 may adjust the output brightness thereof to predetermined minimum brightness according to the control signal received from the IoT server 10.

As the brightness of the lighting apparatus 1400 is also adjusted to the output brightness of the display panel, the viewing environment of the viewer may be considered and, at the same time, power consumption of the display apparatus 100 and the lighting apparatus 1400 may be reduced.

Meanwhile, when the illuminance sensor is turned on, the control unit 170 obtains ambient brightness measured through the illuminance sensor (S1309).

Thereafter, the control unit 170 determines whether the lighting apparatus 1400 is turned on (S1311).

When the lighting apparatus 1400 is turned on, the control unit 170 transmits, to the IoT server 10, a control signal for adjusting the brightness of the lighting apparatus 1400 to the corresponding brightness while controlling the backlight unit to output brightness corresponding ambient brightness (S1313).

The brightness corresponding to ambient brightness has been described in FIG. 10 or 12.

As the brightness of the lighting apparatus 1400 is also output as the brightness corresponding to ambient brightness, the viewing environment of the viewer may be considered and, at the same time, power consumption of the display apparatus 100 and the lighting apparatus 1400 may be reduced.

When the lighting apparatus 1400 connected to the display apparatus 100 is turned off, the control unit 170 controls the backlight unit to output brightness corresponding to ambient brightness (S1315).

According to various embodiments of the present disclosure, it is possible to save energy while maximally considering the viewing environment of a viewer in the event of a power supply crisis.

According to various embodiments of the present disclosure, it is possible to maximize an energy saving effect, by adjusting the brightness of surrounding lighting apparatuses in the event of a power supply crisis.

According to an embodiment of the present disclosure, the above-described method may be embodied as a processor readable code on a medium in which a program is recorded. Examples of processor-readable media include ROM, RAM, CD-ROM, magnetic tape, floppy disk, optical data storage device, and the like, and may be implemented in the form of a carrier wave (for example, transmission over the Internet).

The display device described above may not be limitedly applied to the configuration and method of the above-described embodiments, but the embodiments may be configured by selectively combining all or some of the embodiments so that various modifications may be made.

What is claimed is:

1. A display apparatus comprising:
an illuminance sensor;
a display including a display panel and a backlight unit configured to provide light to the display panel;
a network interface configured to receive power supply information from a server; and
a controller configured to:
determine whether a current power situation is a power alert occurrence situation based on the power supply information,
enable an operation mode of the display apparatus to enter an energy saving mode in case of the power alert occurrence situation,
obtain viewing environment information according to entry into the energy saving mode, and
control the backlight unit to adjust output brightness of the display panel based on the obtained viewing environment information,
wherein the controller adjusts the output brightness of the display panel and an output brightness of a lighting apparatus connectable to the display apparatus through the server to a predetermined minimum brightness if the illuminance sensor is turned off and the lighting apparatus is turned on.

2. The display apparatus of claim 1, wherein the viewing environment information includes one or more of whether the illuminance sensor provided in the display apparatus is turned on or off, information on the backlight unit, ambient brightness measured through the illuminance sensor when the illuminance sensor is turned on, and a power state of the lighting apparatus connectable to the display apparatus through the server.

3. The display apparatus of claim 2,
wherein the power supply information includes information on any one of a plurality of levels of power supply situations, and
wherein the controller controls the backlight unit to adjust the output brightness of the display panel to minimum brightness corresponding to the any one level.

4. The display apparatus of claim 2,
wherein the power supply information includes information on any one of a plurality of levels of power supply situations, and
wherein the controller controls the backlight unit to adjust the output brightness of the display panel to brightness corresponding to the any one level.

5. The display apparatus of claim 1, wherein the controller transmits, to the server, a control signal for adjusting the output brightness of the lighting apparatus to the predetermined minimum brightness.

6. The display apparatus of claim 1, wherein the controller displays a popup window for inquiring entry into the energy saving mode on the display panel, upon determining that the current power situation is the power alert occurrence situation.

7. The display apparatus of claim 6, wherein the controller enables the operation mode of the display apparatus to enter the energy saving mode, when a request for selecting an approval button included in the popup window is received.

8. A method of operating a display apparatus including an illuminance sensor and a display including a display panel and a backlight unit configured to provide light to the display panel, the method comprising:

receiving power supply information from a server;

determining whether a current power situation is a power alert occurrence situation based on the power supply information;

enabling an operation mode of the display apparatus to enter an energy saving mode in case of the power alert occurrence situation;

obtaining viewing environment information according to entry into the energy saving mode; and controlling the backlight unit to adjust output brightness of the display panel based on the obtained viewing environment information, wherein the method further comprises:

obtaining ambient brightness measured by the illuminance sensor, and adjusting the output brightness of the display panel and an output brightness of a lighting apparatus connectable to the display apparatus through the server to a brightness corresponding to the obtained ambient brightness if the illuminance sensor is turned on and the lighting apparatus is turned on.

9. The method of claim 8, wherein the viewing environment information includes one or more of whether the illuminance sensor provided in the display apparatus is turned on or off, information on the backlight unit, the ambient brightness measured through the illuminance sensor when the illuminance sensor is turned on, and a power state of the lighting apparatus connectable to the display apparatus through the server.

10. The method apparatus of claim 9, wherein the controlling includes controlling the backlight unit to adjust the output brightness of the display panel to a predetermined minimum brightness, when the illuminance sensor is turned off.

11. The method of claim 10, wherein the power supply information includes information on any one of a plurality of levels of power supply situations, and wherein the controlling includes controlling the backlight unit to adjust the output brightness of the display panel to minimum brightness corresponding to the any one level.

12. The method of claim 10, further comprising transmitting, to the server, a control signal for adjusting the output brightness of the lighting apparatus to the predetermined minimum brightness, when the lighting apparatus is turned on.

13. The method of claim 8, further comprising transmitting, to the server, a control signal for controlling the lighting apparatus to output the brightness corresponding to the obtained ambient brightness, when the lighting apparatus is turned on.

14. The method of claim 8, wherein the power supply information includes information on any one of a plurality of levels of power supply situations, and wherein the controlling includes controlling the backlight unit to adjust the output brightness of the display panel to brightness corresponding to the any one level.

15. The method of claim 8, further comprising displaying a popup window for inquiring entry into the energy saving mode on the display panel, upon determining that the current power situation is the power alert occurrence situation.

16. The method of claim 15, wherein the enabling includes enabling an operation mode of the display apparatus to enter the energy saving mode, when a request for selecting an approval button included in the popup window is received.

17. A display apparatus comprising:

an illuminance sensor;

a display including a display panel and a backlight unit configured to provide light to the display panel;

a network interface configured to receive power supply information from a server; and a controller configured to:

determine whether a current power situation is a power alert occurrence situation based on the power supply information, enable an operation mode of the display apparatus to enter an energy saving mode in case of the power alert occurrence situation, obtain viewing environment information according to entry into the energy saving mode, and control the backlight unit to adjust output brightness of the display panel based on the obtained viewing environment information, wherein the controller obtains ambient brightness measured by the illuminance sensor and adjusts the output brightness of the display panel and an output brightness of a lighting apparatus connectable to the display apparatus through the server to a brightness corresponding to the obtained ambient brightness if the illuminance sensor is turned on and the lighting apparatus is turned on.

18. The display apparatus of claim 17, wherein the controller transmits, to the server, a control signal for controlling the lighting apparatus to output the brightness corresponding to the obtained ambient brightness.

* * * * *